United States Patent Office 3,227,512
Patented Jan. 4, 1966

3,227,512
PREPARATION OF METAL COMPOUNDS OF BORON HYDRIDES
Frank C. Gunderloy, Jr., Menlo Park, N.J., assignor to Esso Research and Engineering Company, a corporation of Delaware
No Drawing. Filed Nov. 1, 1960, Ser. No. 66,671
3 Claims. (Cl. 23—14)

The present invention relates particularly to the preparation of triboranes or triborohydrides of electropositive metals by reaction of diborane, $B_2H_6$, with a mercury amalgam of the metal in the presence of a saturated cyclic ether as a reaction medium.

The electropositive metals involved are those at least as high in the "Electromotive Force Series of Elements" as beryllium up through lithium, as set forth in the table on page 1356 of the Handbook of Chemistry and Physics, 25th edition. This group of metals includes the alkali and alkaline earth metals and aluminum. The terms triborane and triborohydride are used herein to designate compounds in which these metals are combined with the —$B_3H_8$ group.

The reaction of interest is typified by the preparation of sodium triborane, $NaB_3H_8$:

$$2B_2H_6 + 2Na(Hg) \rightarrow NaBH_4 + NaB_3H_8$$

In carrying out the reaction for making triborane salts, previous workers used no solvents, or employed ordinary aliphatic ethers of low base strength, e.g. ethyl ether or n-butyl ether, as solvents. Using such low base strength ethers, the reaction is slow and the use of vacuum systems with vacuum handling was mandatory for bringing the gaseous borane into contact with the other reactants and solvent. With the vacuum technique for drawing the gaseous diborane into the reaction zone, it is difficult to attain good contact using the low base strength ethers and prolonged periods of contact are required.

The present invention discloses the advantageous use of high base strength saturated cyclic ethers, in particular tetrahydropyran in the reaction of diborane with the metal amalgam. These cyclic ethers have now been found to accelerate the rate of reaction to such an extent that high yields of the desired metal triborane is obtained by simply bubbling the diborane gas into a mixture of the cyclic ethers and the amalgam. Moreover, by using these cyclic ethers, it is no longer necessary to use the cumbersome vacuum techniques. The saturated cyclic ethers of high base strength are compounds which have a strong tendency to donate electrons to a Lewis acid, e.g. $BF_3$. They also have the tendency to form an addition complex or solvate with the metal triborane. These cyclic ethers are typified by tetrahydropyran, tetrahydrofuran, dioxane and close resembling compounds which have a 5- or 6-membered heterocyclic ring containing one to two oxygen atoms connected to carbon atoms in the ring.

The following examples serve to show how the reaction of the gaseous diborane with the metal amalgam is improved by the use of the cyclic ether which promotes the reaction under ambient conditions, temperature and pressure:

Example 1

Using vacuum technique excess sodium amalgam, i.e., more than two mols Na(Hg) per two mols of $B_2H_6$, 23 ml. (liquid) tetrahydropyran and 1652 cc. of diborane at standard temperature and pressure conditions were brought together into a stirred reactor of about 2200 cc. total volume. The pressure in the reactor dropped at the rate of 70–80 mm. Hg per hour as the diborane was consumed by reaction. At this rate of pressure drop, the reaction was complete the next day. No unreacted diborane was recovered. The tetrahydropyran soluble portion of the reaction mixture after filtering off the solid $NaBH_4$, was found to contain a quantitative yield of $NaB_3H_8$.

Under comparable conditions, using n-butyl ether as a solvent, with excess sodium amalgam, 25 ml. n-butyl ether and 1380 cc. of $B_2H_6$ were brought together in the same reactor described with vacuum technique. The reaction zone pressure decreased at a rate of only 10–20 mm. Hg per day and was allowed to run for 14 days. At the end of this time, unreacted diborane was recovered from the reaction zone and the ether soluble portion of the reaction mixture yielded only 30% of the theoretical amount of $NaB_3H_8$.

Example 2

At atmospheric pressure, a 500 ml. flask was attached to a diborane gas generator. The flask was first flushed with nitrogen and then loaded with excess sodium amalgam and 100 ml. of tetrahydropyran. The diborane gas was led into the contents of the reaction flask so that the gas would enter the ether layer above the sodium amalgam when the liquids were at rest. The contents of the reactor flask were stirred magnetically, and 2.51 g. of diborane gas from the generator was bubbled into a stirred mixture of the cyclic ether and the amalgam. The system was left under a slow nitrogen sweep overnight. Work-up of the tetrahydropyran solution gave 1.94 g. of $NaB_3H_8$, which was a recovery of 65% of theory.

A similar experiment as described under Example 2 was carried out using ethyl ether instead of the cyclic ether and no yield of $NaB_3H_8$ was obtained. The foregoing compared experiments demonstrated that the cyclic ether catalytically promoted the reaction of the diborane with amalgam. They also show that with the cyclic ether as the reaction medium and promoter of the reaction, the diborane gas could be made to react by simply bubbling into the mixture of the cyclic ether and the amalgam, thus dispensing with vacuum handling techniques.

Example 3

Using the method and steps described in Example 2 with the same amount of diborane, 400 g. of 1% potassium amalgam with 100 cc. of dry tetrahydropyran were stirred in the flask as diborane was bubbled into the stirred mixture. At the end of the run, the flask was flushed with a slow stream of nitrogen. After filtering off solids, the cyclic ether was evaporated from the ether solution and gave a yield of 1.07 g. of potassium triborane.

Example 4

The method and steps of Example 2 were repeated, using 100 cc. of tetrahydrofuran as the cyclic ether. Analysis of the tetrahydrofuran solution showed a 75% yield of sodium triborane.

Example 5

The methods and steps of Example 2, using 100 cc. of p-dioxan as the cyclic ether. A large bulk of grey-white solid separated during the course of the reaction. Analysis of the dioxan solution showed that it contained no soluble boron compounds. The solid was separated from soluble boron compounds. The solid was separated from the amalgam by decantation of a dioxan suspension, filtration, and drying on the filter under an $N_2$ atmosphere. Infrared examination showed the bands typical of $NaB_3H_8$. Analysis indicated a mixture of $NaBH_4$ and $NaB_3H_8$ as a dioxan solvate.

In the same manner as described, the triborane compounds can be formed of the other electropositive metals falling within the group of: Li, Rb, K, Sr, Ba, Ca, Na, Mg, Al and Be. Usually it is desired to prepare the sodium triborane or alkali metal triboranes.

The metal triboranes are useful as components of solid rocket propellants since they have high chemical energy values. They are useful as reducing agents, e.g. for reducing carbonyl groups to hydroxyl groups, as in converting ketones to alcohols. They may also be used as intermediates in preparing other triborane derivatives. For example, sodium triborane in its ether complex may be reacted with ammonium chloride to form $NH_3 \cdot B_3H_7$. Various other uses may be made of the products obtained in accordance with the present invention. It is not intended to restrict the present invention by the foregoing examples, because various modifications come within the spirit and scope of the invention as set forth in the following claims.

What is claimed is:

1. In a process for preparing the triborohydride salt of a metal selected from the group consisting of alkali, alkaline earth metals, and aluminum, the improvement which comprises bubbling gaseous diborane into a liquid mixture of mercury amalgam of the metal and a saturated cyclic ether selected from the group consisting of tetrahydropyran and tetrahydrofuran, reacting the gaseous diborane under ambient temperature and pressure with the metal in said mixture as the mixture is stirred to form the triborohydride salt of the metal that dissolves in the liquid cyclic ether, separating said liquid cyclic ether solution of the triborohydride salt from residual amalgam and recovering the triborohydride salt of the metal thus formed.

2. In a process for preparing an alkali metal triborohydride by the reaction of gaseous diborane with mercury amalgam of an alkali metal, the improvement which comprises stirring a mixture of the alkali metal amalgam with a saturated cyclic ether selected from the group consisting of tetrahydropyran and tetrahydrofuran in liquid phase, bubbling into said mixture gaseous diborane which is then reacted with the alkali metal under ambient temperature and pressure to form the borohydride and triborohydride of the alkali metal dissolved in the liquid cyclic ether, removing the liquid cyclic ether solution of the alkali metal triborohydride from the residual alkali metal amalgam and recovering the triborohydride salt of the alkali metal from its solution in the liquid cyclic ether by evaporation of the liquid cyclic ether from the solution.

3. In a process for preparing sodium triborohydride by the reaction of gaseous diborane with sodium-mercury amalgam, the improvement which comprises stirring a mixture of sodium-mercury amalgam with a liquid saturated cyclic ether selected from the group consisting of tetrahydropyran and tetrahydrofuran, bubbling into said mixture gaseous diborane in an amount less than the stoichiometric requirement for reaction under ambient temperature and pressure with sodium-mercury amalgam to form sodium borohydride and sodium triborohydride, removing the liquid saturated cyclic ether containing sodium triborohydride thus formed in solution and recovering the sodium triborohydride from said solution.

References Cited by the Examiner
UNITED STATES PATENTS

| | | | |
|---|---|---|---|
| 2,545,633 | 3/1951 | Schlesinger | 23—14 |
| 2,921,963 | 1/1960 | Baker et al. | 260—606.5 |
| 2,975,027 | 3/1961 | Wittig | 23—14 |
| 3,031,259 | 4/1962 | Edwards et al. | 23—14 |

OTHER REFERENCES

Hough: JACS 78, p. 689, Feb. 5, 1956.

Schechter et al.: "Boron Hydrides and Related Compounds," prepared under Contract NOa (s) 10992 for Dept. of Navy, Bureau of Aeronautics; prepared by Callery Chemical Co., printed March 1951, declassified December 1953, pp. 9 and 10.

MAURICE A. BRINDISI, *Primary Examiner.*

ROGER L. CAMPBELL, LEON D. ROSDOL,
*Examiners.*